United States Patent [19]

Murayama et al.

[11] Patent Number: 4,517,560

[45] Date of Patent: May 14, 1985

[54] PRINTING SYSTEM

[75] Inventors: Tomio Murayama; Yoshiki Kikuchi; Takashi Ohmori, all of Kanagawa, Japan

[73] Assignee: Fuji Xerox Co., Ltd., Tokyo, Japan

[21] Appl. No.: 378,445

[22] Filed: May 14, 1982

[30] Foreign Application Priority Data

May 15, 1981 [JP] Japan .................................. 56-72145

[51] Int. Cl.³ ........................ G09G 3/00; G01D 15/18; G01D 9/00
[52] U.S. Cl. .................................... 340/790; 340/735; 340/723; 340/728; 346/75; 346/33 R
[58] Field of Search ............. 346/78, 76 L, 110, 33 R, 346/75; 178/30; 340/715, 790, 723, 728, 735, 731; 358/133

[56] References Cited

U.S. PATENT DOCUMENTS

| 2,921,124 | 1/1960 | Graham | 340/728 X |
| 3,192,315 | 6/1965 | Remley | 358/133 |
| 3,469,252 | 9/1969 | Bet | 340/715 |
| 3,625,142 | 12/1971 | Bresler | 346/78 X |
| 3,678,497 | 7/1972 | Watson et al. | 178/30 X |
| 3,878,536 | 4/1975 | Gilliam | 340/728 |
| 3,903,517 | 9/1975 | Hafner | 340/731 X |
| 4,107,786 | 8/1978 | Masaki et al. | 178/30 X |

Primary Examiner—George H. Miller, Jr.
Attorney, Agent, or Firm—Sughrue, Mion, Zinn Macpeak & Seas

[57] ABSTRACT

A printing system is provided which allows selected characters or symbols to be emphasized without increasing the density thereof. A video signal containing printing data for a character to be emphasized is delayed and logically added to an undelayed video signal to expand the "black" portion of the signal on the time axis.

3 Claims, 10 Drawing Figures

B

————▶TIME

→ TIME

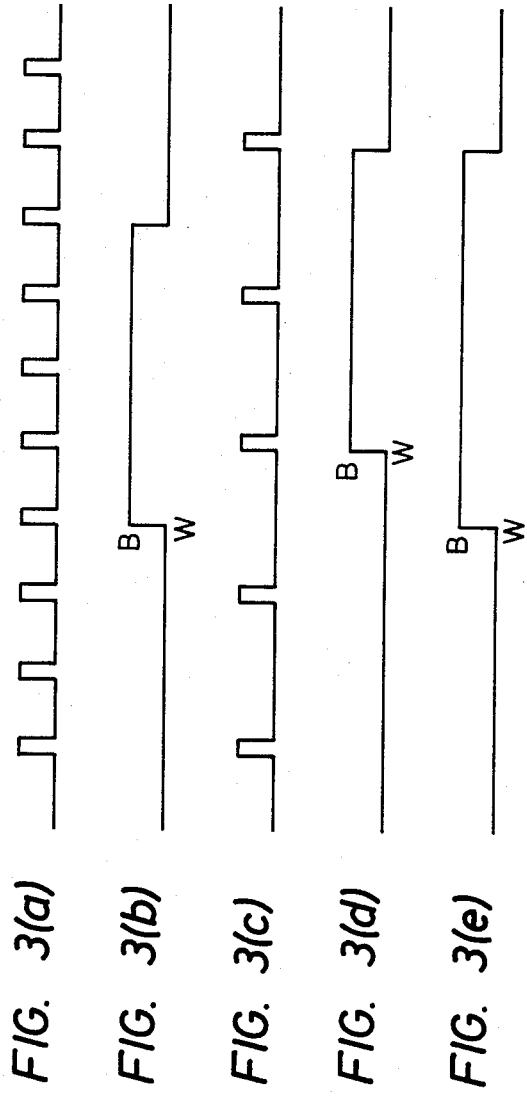

PRINTING SYSTEM

BACKGROUND OF THE INVENTION

This invention relates to printing systems, and more particularly to a printing system in which some characters or symbols are printed with additional emphasis.

In printing sentences, sometimes it is necessary to print particular characters, phrases or symbols with additional emphasis. In order to meet this requirement, in an impact type printer, such characters, phrases or symbols are printed plural times so that they become higher in density.

However, in most non-impact type printers, even if the same position is printed plural times as described above, the density is not increased as expected; that is, it is practically difficult to increase the visual effect of the printed characters, etc. For instance, in a printer employing a thermal transfer system, a recording medium coated with thermally soluble or thermally sublimating ink is used in a manner such that the ink at the portion where printing is effected is heated so as to be transferred onto the recording sheet. Under normal recording conditions, the ink thus heated is substantially completely transferred onto the recording sheet. Accordingly, even if the same part of the recording medium is again heated, the amount of transferred ink is scarcely increased. In other words, the same position is printed plural times as described above, but the density of the position is not increased to the extent that it is clearly distinguishable from that of other printed positions. Furthermore, it should be noted that in the thermal transfer type printer, the recording medium is placed in surface contact with the recording sheet, so that the ink is transferred from the former to the latter. Therefore, it is impossible to employ a method in which, after the recording medium used for recording is peeled off the recording sheet, an unused portion of the recording medium is brought into contact with the recording sheet, to increase the amount of ink transferred.

SUMMARY OF THE INVENTION

In view of the foregoing, an object of this invention is to provide a printing system for a printer in which printing is carried out using an electrical video (pattern) signal; in which printing can be carried out with emphasis, without increasing the density of printed characters, etc.

In the invention, a delay circuit 1 and a logical summation circuit (or an OR circuit) 2 are provided in the printer. When an emphasized printing instruction signal 3 for performing printing with extra emphasis is produced, a video signal 4 and a delayed video signal obtained by delaying the video signal 4 for a predetermined period of time are subjected to logical summation (or ORed) to obtain an emphasized video signal 6, the emphasized video signal 6 being applied to the printing section.

BRIEF DESCRIPTION OF THE DRAWINGS

FIGS. 3(a)–3(e) illustrate the waveforms of various signals for describing the operation of various parts of the emphasized video signal forming unit.

DETAILED DESCRIPTION OF THE PREFERRED EMBODIMENTS

Figures 1, 2, 4A, 4B, 4C:
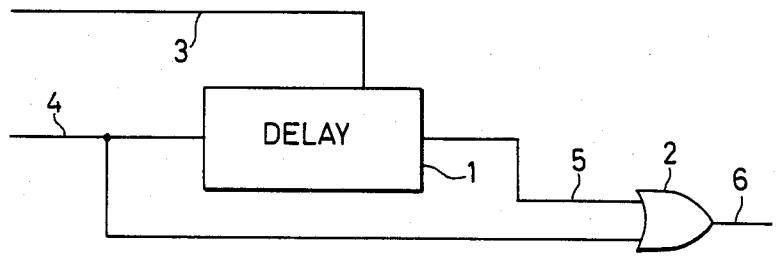
FIG. 1 is a theoretical diagram for describing the fundamental technical concept of the invention.
FIG. 2 is a block diagram showing an emphasized video signal forming unit according to the invention.
FIGS. 4(a)–4(c) are explanatory diagrams showing the relationship between the video signals and the printing of a character with emphasis.

FIG. 2 shows an emphasized video signal production section of a printer. In this embodiment, a D latch 1A (which is for instance a bipolar TTL IC 7474 made by Texas Instrument Co.) is employed as the delay circuit, and a two-input OR gate 2A (which is for instance a bipolar TTL IC 7432 made by Texas Instrument Co.) is employed as the logical sum circuit.

A character generator (not shown) in the printer outputs a video signal which is sampled by sampling clock signal shown in FIG. 3(a), whereby a video signal 4 (FIG. 3(b)) representing particular lines of a character to be printed with emphasis is applied to an input terminal D of the D latch 1A. A clock signal 8 (FIG. 3(c)) obtained by frequency-dividing the aforementioned sampling clock signal is supplied to the clock input terminal C of the D latch 1A at all times. On the other hand, an emphasized printing instruction signal 3 is supplied to the clear terminal CLR of the D latch 1A for the period during which a character is to be printed with emphasis, so that clearing the D latch 1A is inhibited. Therefore, the video signal 4 of (for example) the character "B" is supplied to the D latch 1A, and a delayed video signal 5 in which the "black" image signal is delayed is provided at the output terminal Q of the D latch 1A in synchronization with the rise of the clock signal 8. The video signal 4 and the delayed video signal 5 are applied to the two-input OR gates 2A. As a result, an emphasized video signal 6 is obtained in which the range of the "black" image signal on the time axis is increased, as shown in FIG. 3(e).

The character generator outputs the video signal 4 for every line as described above. When these video signals 4 thus outputted are replaced by the emphasized video signals for the portions where printing should be effected with emphasis, the printing section (not shown) performs printing with a pattern corresponding to the time-expanded video signals.

FIG. 4(a) illustrates the character "B" as printed directly by the video signals 4, while FIG. 4(b) shows the character "B" as shifted along the time axis by the aforementioned delayed video signals 5. With the emphasized vide signals 6, an emphasized printed character "B" is obtained by overlapping these characters on the same time axis, as shown in FIG. 4(c).

In the invention, emphasized printing is carried out by changing the pattern of the characters. Therefore, in the invention, unlike a printing system in which a character must be printed plural times, the recording speed is not decreased even if emphasized printing is carried out.

In the above-described embodiment, emphasized printing is carried out by expanding the character pattern in the line direction (or in the main scanning direction); however, emphasized printing may be carried out by expanding the character pattern in the column direction (or in the auxiliary scanning direction as well). In the simplest system for practicing the former, a delay memory for one line is provided in the printer, and the output of the delay memory and a video signal bypassing the delay memory are subjected to logical summation (or ORed) only when emphasized printing is to be carried out. The emphasized printing method of the invention is not limited to only the above-described processes; that is, a method in which the character pattern is expanded in both the line and column directions may be effectively employed.

In the above-described embodiment, the video signal was described as being supplied by the character generator of the printer; however, the video signal may be supplied, for instance, from a host system.

What is claimed is:

1. In a printing system for a printer in which a video signal representing the patterns of a character or symbol is produced to control a printing section to perform printing, the improvement comprising means for printing a character or symbol with emphasis, including means for delaying said video signal for a predetermined period of time to produce a delayed video signal representing a delayed version of an entire character or symbol, and means for logically adding said video signal and said delayed video signal to provide an emphasized video signal, said emphasized video signal being applied to said printing system for printing said character or symbol.

2. A printing system as claimed in claim 1, said logical addition means comprising an OR gate to which said video signal and said delayed video signal are applied.

3. A printing system as claimed in claim 1, said delaying means comprising latch means actuated by an emphasized printing instruction signal and operating to output said delayed video signal in response thereto.

* * * * *